US007512111B2

(12) United States Patent
Kauhanen

(10) Patent No.: US 7,512,111 B2
(45) Date of Patent: Mar. 31, 2009

(54) TIME ADJUSTMENT METHOD AND TIME STAMPING METHOD IN TELECOMMUNICATION SYSTEM AND TELECOMMUNICATION SYSTEM

(75) Inventor: Jouni Kauhanen, Oulu (FI)

(73) Assignee: Nokia Corporation, Espoo (FI)

( * ) Notice: Subject to any disclaimer, the term of this patent is extended or adjusted under 35 U.S.C. 154(b) by 908 days.

(21) Appl. No.: 10/611,679

(22) Filed: Jul. 2, 2003

(65) Prior Publication Data

US 2004/0258042 A1     Dec. 23, 2004

(30) Foreign Application Priority Data

May 20, 2003     (FI)     ................... 20030749

(51) Int. Cl.
*H04J 3/06* (2006.01)
*H04B 1/00* (2006.01)
(52) U.S. Cl. .................... 370/350; 455/114.2
(58) Field of Classification Search ......... 370/328–338, 370/350, 503, 508, 516, 518, 519; 455/13.4, 455/522, 114.2, 114.3, 127.1
See application file for complete search history.

(56) References Cited

U.S. PATENT DOCUMENTS

| 4,411,007 | A | * | 10/1983 | Rodman et al. ............. 375/356 |
| 5,838,672 | A | * | 11/1998 | Ranta ......................... 370/335 |
| 6,201,802 | B1 | * | 3/2001 | Dean ........................... 370/350 |
| 2002/0009974 | A1 | * | 1/2002 | Kuwahara et al. .......... 455/67.6 |

FOREIGN PATENT DOCUMENTS

| EP | 1 174 726 A2 | 1/2002 |
| EP | 1 217 779 A1 | 6/2002 |

OTHER PUBLICATIONS

3rd Generation Partnership Project; Technical Specification Group Radio Access Network; UE Positioning Enhancements (Release 4), 3GPP TR 25.847 V1.0.0 (Nov. 2000).
3rd Generation Partnership Project; Technical Specification Group Radio Access Network; Physical Layer Procedures (FDD) (Release 5), 3GPP TS 25.214 V5.0.0 (Mar. 2002).
3rd Generation Partnership Project; Technical Specification Group Radio Access Network; Stage 2 Functional Specification of User Equipment (UE) Positioning in UTRAN (Release 5), 3GPP TS 25.305 V5.4.0 (Mar. 2002).
3rd Generation Partnership Project; Technical Specification Group Radio Access Network; UTRAN Lub Interface NBAP Signalling (Release 4), 3GPP TS 25.433 V4.8.0 (Mar. 2003).

\* cited by examiner

*Primary Examiner*—Seema S Rao
*Assistant Examiner*—Mon Cheri S Davenport
(74) *Attorney, Agent, or Firm*—Squire, Sanders & Dempsey, LLP

(57) ABSTRACT

A time adjustment method, a time stamping method and a telecommunication system are provided. The invention is based on performing a power measurement in the base station on a signal generated in the base station, and providing the signal with time characteristics proportional to a time reference received in the base station. Embodiments of the invention enable accurate synchronization of a base station and precise positioning of mobile stations.

34 Claims, 4 Drawing Sheets

TIME ADJUSTMENT METHOD AND TIME STAMPING METHOD IN TELECOMMUNICATION SYSTEM AND TELECOMMUNICATION SYSTEM

BACKGROUND OF THE INVENTION

1. Field of the Invention

The invention relates to a time adjustment method in a telecommunication system, a time stamping method in a telecommunication system, and a telecommunication system.

2. Description of the Related Art

In modern telecommunication systems, timing and time stamping of signals transmitted from a base station in a telecommunication system can be used, for example, for synchronization and positioning purposes.

In a prior art time stamping process, the transmission time of a signal transmitted from the base station is determined by using the time point of generating the signal in the base band parts of the transmitter of the base station, and possibly information on the delay between generating the signal in the base band parts and transmitting the signal from an antenna unit of the base station. This delay is caused by electric components and wires in between the base band part and the antenna unit.

The prior art solutions in time characterization of signals transmitted from the base station, however, are insufficient in accuracy to fulfill the tightened requirements of time characterization. The insufficiency arises from unpredictable nature of the electronics in radio transmitters, giving rise to unpredictable variation in the propagation time of a signal between the base band parts and the antenna of the base station. The insufficiency in accuracy of the time characterization causes, for example, inaccuracy in measuring the propagation time of a signal between the base station and a mobile station, giving rise to errors in location information of the mobile station.

Therefore, it is desirable to consider improved tools for time stamping and time adjustment.

SUMMARY OF THE INVENTION

An object of the invention is to provide an improved time adjustment method in a telecommunication system, an improved time stamping method in a telecommunication system, and an improved telecommunication system. According to an aspect of the invention, there is provided a time stamping method in a telecommunication system, having the steps of receiving, in a base station, a time reference signal providing time reference in the telecommunication system, generating an idle period in the transmission of a base station, determining, in the base station, time characteristics of the idle period relative to the time reference by means of a power measurement, and providing at least a portion of data to be transmitted from the base station with time characteristics proportional to the time reference by using the time characteristics of the idle period.

According to a second aspect of the invention, there is provided a time adjustment method in a telecommunication system, having the steps of receiving, in a base station, a time reference signal providing time reference in the telecommunication system, generating a test signal in the base station, detecting the test signal in the base station, and providing the test signal with time characteristics proportional to the time reference based on detection of the test signal and the time reference.

According to another aspect of the invention, there is provided a telecommunication system having a base station for providing radio transmission and reception for mobile stations, wherein the base station comprises a time reference signal receiving unit for receiving a time reference signal providing time reference in the telecommunication system, and wherein the base station has an idle period generator for generating an idle period in the transmission of the base station. Additionally, the base station has a detecting unit operationally connected to the idle period generator and the time reference signal receiving unit for determining time characteristics of the idle period relative to the time reference by means of a power measurement, and a time stamping unit operationally connected to the detecting unit for providing at least a portion of data to be transmitted from the base station with the time characteristics proportional to the time reference by using the time characteristics of the idle period.

Preferred embodiments of the invention are described in the dependent claims and in latter portions of the disclosure.

The invention is based on carrying out a measurement on a signal generated in the base station, and providing the signal with time characteristics proportional to the time reference obtained from a satellite signal.

The methods and system of the invention provide several advantages. The invention provides an accurate time characterization for a signal transmitted from the base station. In an embodiment of the invention, the invention enables accurate positioning of a mobile station.

BRIEF DESCRIPTION OF THE DRAWINGS

In the following, the invention will be described in greater detail with reference to embodiments and the accompanying drawings, in which.

DETAILED DESCRIPTION OF THE PREFERRED EMBODIMENT(S)

Figure 1:
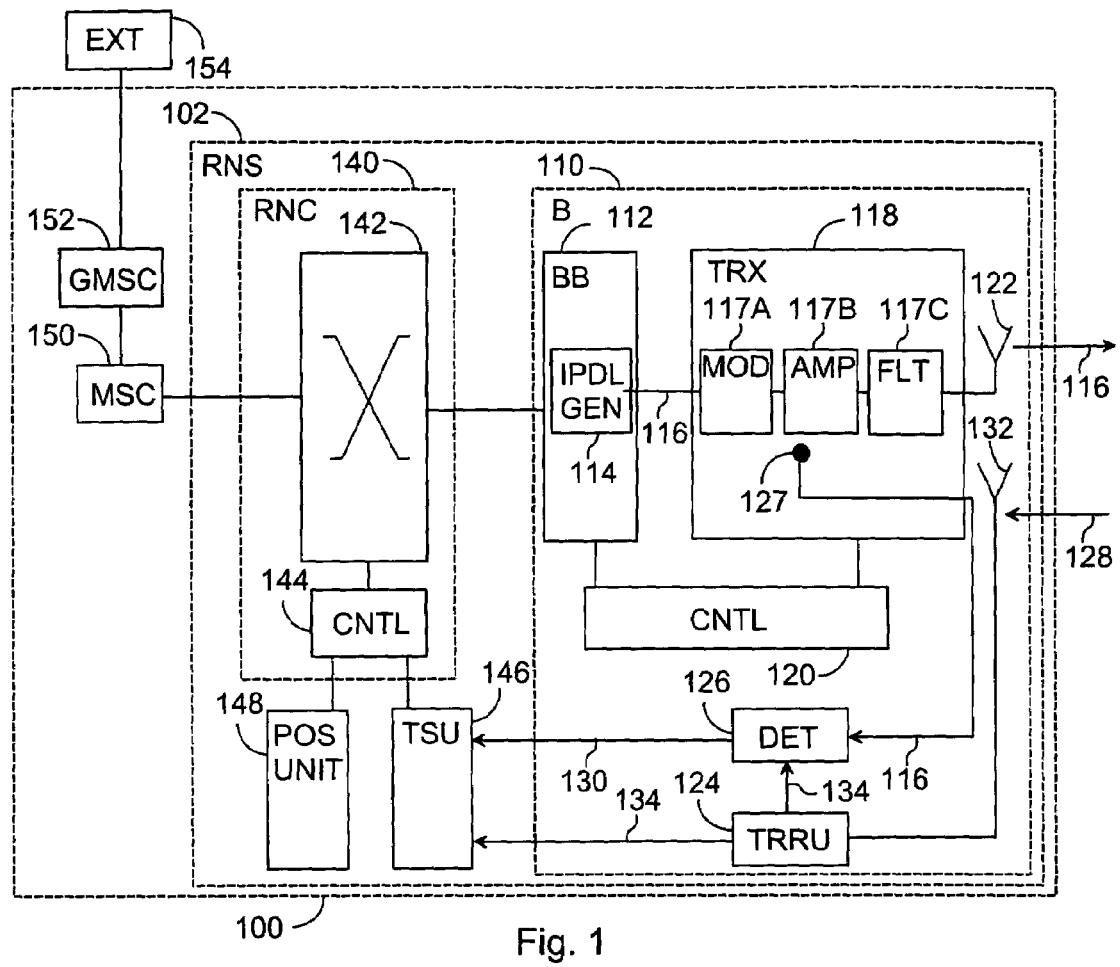
FIG. 1 shows an example of a structure of a cellular telecommunication system.

A simplified structure of a telecommunication system 100 at the network element level is illustrated in FIG. 1. The radio-independent layer of the telecommunication system is represented by a mobile switching center (MSC) 150 and a gateway mobile services switching center (GMSC) 152 located between the mobile switching center 150 and external networks 154, such as the public land mobile network (PLMN) or the public switched telephone network (PSTN). The telecommunication system 100 may also include packet-switched network elements, such as a serving GPRS support node (SGSN) and a gateway GPRS support node (GGSN) for supporting GPRS (General Packet Radio Service).

The tasks the mobile services switching center 150 performs include: switching, paging, user equipment location registration, handover management, collection of subscriber billing information, encryption parameter management, frequency allocation management, and echo cancellation. The mobile switching center 150 contains functionalities related to mobile station subscription authorization and management of call-related and non-call related positioning of mobile stations.

The gateway mobile switching center 152 is responsible for circuit-switched connections between the telecommunication system 100 and external networks 154.

The telecommunication system 100 comprises a radio network subsystem (RNS) 102, which comprises a radio network controller (RNC) 140 and at least one base station 110.

Base station is a generic name for a network element providing radio transmission and reception for mobile stations in the telecommunication network area. The technique in implementing the radio interface may vary between different telecommunication systems. For example, in UMTS (Universal Mobile Telephone System), the base station 110 is called a Node B, which utilizes a wideband code division multiple access technique (WCDMA) in implementing the radio interface. The structure of the exemplified telecommunication system is described in terms of UMTS network elements, which can easily be associated with their counterparts in other telecommunication systems by a person skilled in the art.

The radio network controller 140 controls the base station 110, being responsible for the following tasks, for instance: radio resource management of the base station 110, inter-cell handovers, allocation of frequencies to the base station 110, management of frequency hopping sequences, measurement of time delays on the uplink, implementation of the operation and maintenance interface, and power control.

The radio network controller 140 comprises a group switching field 142 and a control unit 144. The group switching field 142 is used for switching speech and data and for connecting signalling circuits. The control unit 144 carries out call controlling, mobility management, collection of statistics, signalling and control and management of resources.

The base station 110 comprises a control unit 120, a base band unit (BB) 112, a transceiver unit (TRX) 118, and an antenna unit 122.

The base band unit 112 includes a digital signal processor, ASIC circuits (application specific integrated circuit), routes, memory means and software e.g. for encoding and decoding signals, performing error correction functions and possibly for interleaving and de-interleaving bits.

The transceiver unit 118 may comprise a modulator unit 117A connected to the base band unit 112 for performing a conversion between a base band frequency and a radio frequency providing the radio connection between the base station 110 and a mobile station. The modulator unit 117A may comprise, for example, a modulator for up-converting a base band signal into a radio frequency used in the downlink direction.

The transceiver unit 118 may further comprise an amplifier unit 117B connected to the modulator unit 117A for amplifying a radio frequency. The amplifier unit 117B may comprise, for example, a linear power amplifier for amplifying the downlink radio signal.

The transceiver unit 118 may further comprise a filter unit 117C for providing desired frequency properties of the radio frequency spectrum of the radio frequency signal passing the transceiver 118. In an embodiment, the filter unit 117C is a duplex filter for providing a separation between the uplink and downlink radio signals.

The control unit 120 controls the transceiver unit 118 and the base band unit 112.

The base station 110 comprises a time reference signal receiving unit 124 for receiving a time reference signal 128 and providing time reference 134 in the telecommunication system. In one embodiment, the time reference signal receiving unit 124 is connected to an antenna 132 for time reference signal 128 reception. The time reference signal receiving unit 124 includes, for example, a radio receiver for receiving a radio signal carrying the time reference 134, an analogue-to-digital converter for sampling the received signal, a digital signal processor for processing the digitized signal and a decoder for decoding the processed signal. In another embodiment, at least some of the tasks of the time reference signal receiving unit 124 are performed in the base station controller 120 or in the radio network controller 140.

In an embodiment, the time reference signal 128 contains the universal time coordinates (UTC). The universal time coordinates may be used to define another time scale proportional to the universal time coordinates in the base station 110.

In another embodiment, the time reference signal 128 is transmitted from a satellite system distributed in geostationary orbits. Such satellite systems are, for example, the global positioning system (GPS) and the global navigation satellite system (GLONASS).

In another embodiment, the time reference signal 128 is composed of at least four components transmitted from separate satellites, and the position of a base station 110 and the time reference 134 are determined using the four components. In an additional embodiment, the time reference signal is a 1 PPS (Pulse Per Second) signal of GPS.

In another embodiment, the time reference signal receiving unit 124 supports a "position hold mode" enabling utilization of less than four components of the time reference signal. The "position hold mode" is based on specific timing software.

In an embodiment, the time reference signal 128 is delivered to the base station 110 by means of electrical or optical guides, in which case the antenna 132 is not needed. The time reference signal 128 may contain information on the global time or the internal time of the telecommunication system. In an embodiment, the time reference signal 128 is generated in a location management unit (LMU) or a related network element providing time reference.

The concept of proportionality between the time characteristics of a signal, such as an idle period 116 or a data sequence, and the time reference 128 can be understood as a relationship wherein any time point $t_c$ expressing time characteristics can be expressed in terms of the time reference $t_{ref}$. In mathematical terms, the relationship can be written as $$t_c = t_c(t_{ref}), \qquad (1)$$

where $t_c(t_{ref})$ is a function of the time reference $t_{ref}$. In another embodiment, the time reference 134 is a real-time reference.

In an aspect, the invention provides a time stamping method in a telecommunication system. Time stamping is known as a service providing data with real-time characteristics, the time stamps for synchronization of media streams, or other purposes. The real-time characteristics of data include, for example, the emission time of a predefined portion of data from the antenna unit 122 of the base station.

The base station 110 comprises an idle period generator 114 for generating an idle period 116 in the transmission of the base station 110.

The idle period 116 generated in the idle period generator 114 is delivered to the transceiver unit 118, wherein the idle period 116 is detected by a detecting unit 126. The time reference 134 is delivered to the detecting unit 126 from the time reference signal receiving unit 124, which provides the idle period 116 with time characteristics 130 proportional to the time reference 134. The detection of the idle period 116 is based on measuring the power of the transmission of the base station 110, wherein the power of the idle period 116 is weaker than the power of the transmission otherwise.

In an embodiment, the detecting unit 126 comprises a gauge 127 located between the base band unit 112 and the antenna unit 122 for performing a power measurement on the idle period 116. The detecting unit 126 also comprises an idle period time stamping unit not shown for providing the idle period 116 with time characteristics 130 proportional to the time reference 134 received by the detecting unit 126 from the time reference signal receiving unit 124. The idle period time stamping unit 146 may be implemented using a digital processor with suitable computer programs or by using an ASIC. In an embodiment, the tasks of the detecting unit 126 requiring signal processing are implemented in the radio network controller 140 or in the control unit 120 of the base station 110.

Figure 2:
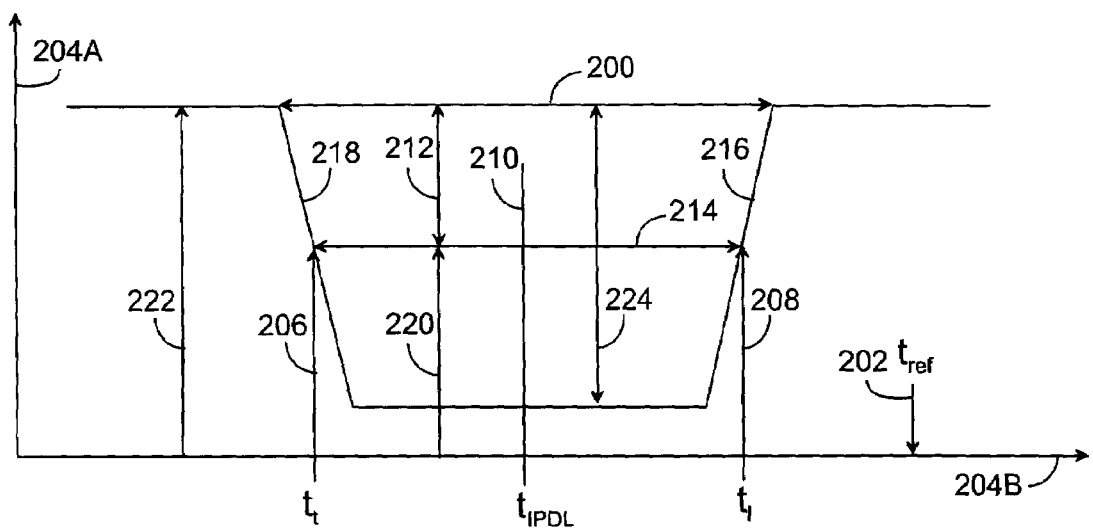
FIG. 2 shows an example of an idle period.

FIG. 2 illustrates an idle period 200 and the time reference 202. The vertical axis 204A shows signal power in arbitrary units. The scale of the horizontal axis 204B is proportional to the time reference 202 such that any time point in the time axis 204B can be expressed in terms of the time reference 202. The time dimensions of the idle period 200 with respect to the time reference 202 are exaggerated for simplicity. In reality, the time scale between the reception of two successive time reference signals 128 may be of the order of seconds whereas the time scale of an idle period 200 may be of the order of milliseconds. However, the accuracy of the time reference 202 is usually better than the order of 300 ns. For a PPS receiver tracking 4 satellites, an absolute time accuracy better than 200 ns relative to the UTC is specified for a low-dynamic situation.

The time characteristics of the idle period 200 include, for example, the timing of the leading edge 216, the timing of the trailing edge 218, and the timing of a predefined portion 210 of the idle period 200. The timing of the portions 216, 218, 210 of the idle period 200 may be a real-time of transmission, for example. The timing of the leading edge 216 and the timing of the trailing edge 218 may be represented by time points 206, 208, respectively, when the power of the idle period 200 exceeds at least one threshold 220. Such a threshold 220 may be defined, for example, in terms of a reference transmit power 222 and a predefined gap 212 representing difference between the reference transmit power 222 and the threshold 220. The reference transmit power 222 may be, for example, an average transmit power or a maximum transmit power.

In an embodiment, the idle period generator 114 shown in FIG. 1 is implemented in the digital signal processor of the base band unit 112. In another embodiment, the idle period 116, 200 is generated by weighting a signal so that a required time mask is achieved. In an embodiment, the length 214 of the idle period is 2560 chips, and the ramps associated with the leading edge 216 and the trailing edge are 27 chips long. The attenuation 224 associated with the idle period 200 with respect to the reference transmit power 222 may vary from 20 dB to 45 dB, for example. The large power dynamics due to attenuation 224 and the steep edges 216, 218 of the idle period 116, 200 enable efficient detection and identification of the idle period 116, 200 by means of power measurement of the transmission of the base station 110.

Supplementary information on the idle period 116, 200 is available in the 3GPP (3$^{rd}$ Generation Partnership Project) specifications 25. 214 and 25. 433, which are thereby incorporated by reference. In an embodiment, the detecting unit 126 comprises a diode gauge 127 for power measurement operating at a radio frequency range. In an embodiment, the diode gauge 127 recognizes an idle period 116, 200 by detecting a decrease 212 in the transmit power of the idle period 116, 200. When a predefined threshold 220 in power is measured in the detecting unit 126, the time of measurement relative to the time reference 134, 202 is determined. In an embodiment, the time of measurement is a time characteristic of the idle period 116, 200.

At least one time characteristic 130, 206, 208, 210 of the idle period 116, 200 is delivered to the time stamping unit 146 connected to the detecting unit 126. In the time stamping unit 146, at least a portion of data to be transmitted from the base station 110 is provided with time characteristics proportional to the time reference 134, 202 by using at least one time characteristic 130, 206, 208, 210 of the idle period 116, 200.

In one embodiment, time characteristics proportional to the time reference provided for the data includes the time of emission or estimated time of emission of the data from the antenna unit 122 of the base station 110. Supplementary information related to idle periods in obtaining location information for mobile stations is available in 3GPP specifications 25. 305 and 25. 847, which are thereby incorporated by reference. In an embodiment, the time characteristics provided for the data are obtained from time characteristics 130, 206, 208 210 of the idle period 116, 200 by using the scheduling information of the data and the idle period 116, 200.

In an embodiment, timing $t_{IPDL}$ of a predefined portion 210 of the idle period 116, 200 is determined relative to the time reference 134, 202 by means of the power measurement, and at least a portion of data to be transmitted from the base station 110 is provided with time characteristics proportional to the time reference 134, 202 by using the timing $t_{IPDL}$ of the predefined portion 210 of the idle period 200. In an embodiment, the predefined portion 210 of the idle period 200 is defined such that the timing point $t_{IPDL}$ of the idle period 200 can be obtained as an average of timing 208 and 206 of the leading edge 216 and the trailing edge 218, respectively, of the idle period 200. In an embodiment, the timing $t_{IPDL}$ of the idle period 200 is defined in terms of a weighted average of the timing of the leading edge 216 and the trailing edge 218.

In an embodiment, the detecting unit 126 comprises a plurality of gauges 127 for providing a plurality of power measurements on the idle period 116, 200. In an embodiment, each measuring gauge 127 performs gauge-specific power measurements on the leading edge 216 and the trailing edge 218 of the idle period 200, and the gauge-specific measurements are averaged to obtain the timing $t_{IPDL}$ of the predefined portion 210 of the idle period 200.

In an embodiment, a predefined portion of a data stream to be transmitted from the base station 110 is provided with the time characteristics, and a portion of the data stream not provided time characteristics is provided with time characteristics by using time characteristics of the predefined portion of the data stream.

In an embodiment, the time stamping unit 146 is implemented in the radio network controller 140, for example in the serving location mobile center (SMLC). In an embodiment, the time stamping unit 146 is implemented in the radio network controller 140 by using a software application.

Figure 3:
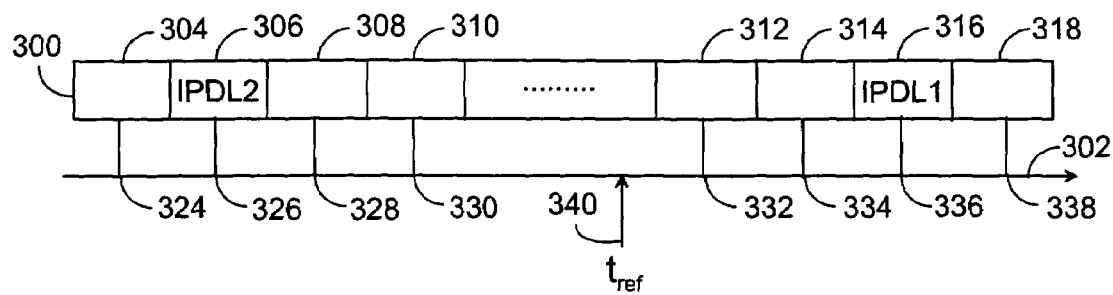
FIG. 3 shows an example of a data structure according to an embodiment of the invention.

An example of a data structure to be transmitted from the base station 110 is shown in FIG. 3. A frame 300 and a time reference 340 with respect to time axis 302 are shown. The frame is divided into sub-units 304, 306, 308, 310, 312, 314, 316, and 318 with time characteristics 324, 326, 328, 330, 332, 334, 336, and 338, respectively. In an embodiment, the sub-units from 304 to 318 of the frame are time slots with equal duration. The sub-units from 304 to 318 include at least a portion of data provided with the time characteristics. The sub-units 306, 316 including idle periods 116, 200 are also shown. In this context, these sub-units are called idle periods with reference numerals 306 and 316. The time characteristics of the idle periods 306 and 316 are identified with reference numerals 326 and 336, respectively.

In an embodiment, the detecting unit 126 is configured to determine time characteristics 326, 336 of a plurality of idle periods 306, 316 in a frame 300 relative to time reference 340, and the time stamping unit 146 is configured to provide the frame 300 with time characteristics proportional to the time reference 340 by using time characteristics of the plurality of idle periods 306, 316 in the frame 300.

In an embodiment, time characteristics 326, 336 of the plurality of idle periods 306, 316 are averaged taking into account the relative positions of the idle periods 306, 316 in the frame 300. The averaging enables a more reliable determination of the time characteristics of the frame 300.

In an embodiment, the time characteristics of the frame 300 are provided for a predefined portion, such as a predefined time slot and/or a predefined symbol sequence of the frame 300. In an embodiment, the predefined time slot is the first time slot 318 in the frame 300. In an embodiment, the predefined symbol sequence of the frame 300 is a pilot sequence.

In an embodiment, the time characteristics of the frame 300 are associated with the frame number of the frame 300.

In an embodiment, the base station 110 comprises an antenna unit 122 operationally connected to the idle period generator 114 for emitting the idle period 116, 200. When emitting the idle period 116, 200, a radio signal including the idle period 116, 200 is transmitted from the antenna 122 of the base station 110.

In an embodiment, the detecting unit 126 is configured to determine the time characteristics 206, 208, 210 of the idle period 116, 200 such that the uncertainty of the time interval between determining the time characteristics 206, 208, 210 of the idle period 116, 200 and emitting the idle period 116, 200 from the antenna unit 122 of the base station 110 is below a predefined value. In this context, the time point of determining time characteristics 206, 208, 210 of the idle period 116, 200 is the time point of the power measurement. The predefined value for the maximum of the uncertainty is dictated by the requirements of the telecommunication system. For example, if the accuracy requirement of observed time difference of arrival (OTDOA) is $\Delta t$, the uncertainty should not exceed $\Delta t$.

Configuring the detecting unit 126 includes locating the gauge 127 for the power measurement in the transceiver unit 118. The uncertainty of the time interval between determining the time characteristics 130, 206, 208, 210 of the idle period 116 and emitting the idle period 116 causes an error of time characteristics of the idle period 116, 200, which error is further transferred to the time characteristics of the data to be transmitted from the base station 110. An error in time characteristics of the data causes, for example, an error in determination of an observed time difference of arrival, and an error in a mobile station positioning.

If the time interval between determining time characteristics 206, 208, 210 of the idle period 116 and emitting the idle period 116 is known with a required accuracy, the time interval can be accounted in the real-time characteristics 206, 208, 210 of the idle period 116, 200 by adding the time interval to the time which was determined with the power measurement.

In an embodiment, the gauge 127 for power measurements is located between the base band unit 112 and the amplifier unit 117B, by which arrangement the effects of the modulator unit 117A on the time characterization of the idle period 116 are reduced.

In an embodiment, the gauge 127 for power measurements is located between the base band unit 112 and the filter unit 117C, by which arrangement the effects of the modulator unit 117A and the amplifier unit 117B on the time characterization of the idle period 116 are reduced.

In an embodiment, the gauge 127 for power measurements is located between the base band unit 112 and the antenna unit 122, by which arrangement the effects of the modulator unit 117A, the amplifier unit 117B, and the filter unit 117C o the time characterization of the idle period 116 are reduced.

In an embodiment, the detecting unit 126 is configured to determine time characteristics 130, 206, 208, 210 of the idle period 116 at a moment of emitting the idle period 116. The configuration can be performed, for example, by connecting the gauge 117 to the antenna feeder feeding the antenna 122. This embodiment is advantageous in systems where the delay of the idle period 116 between the base band unit 112 and the antenna unit 122 is not known with a predefined accuracy.

In an embodiment, the base station 110 is configured to synchronize transmission of the base station 110 by using the time characteristics 130, 206, 208, 210 of the idle period 116 relative to the time reference 134, 202. A clock of the base station 110, for example, may be adjusted, by using the time characteristics 130, 206, 208, 210 of the idle period such that the frames transmitted by the base station 110 remain synchronized over a predetermined period of time.

Figure 4:
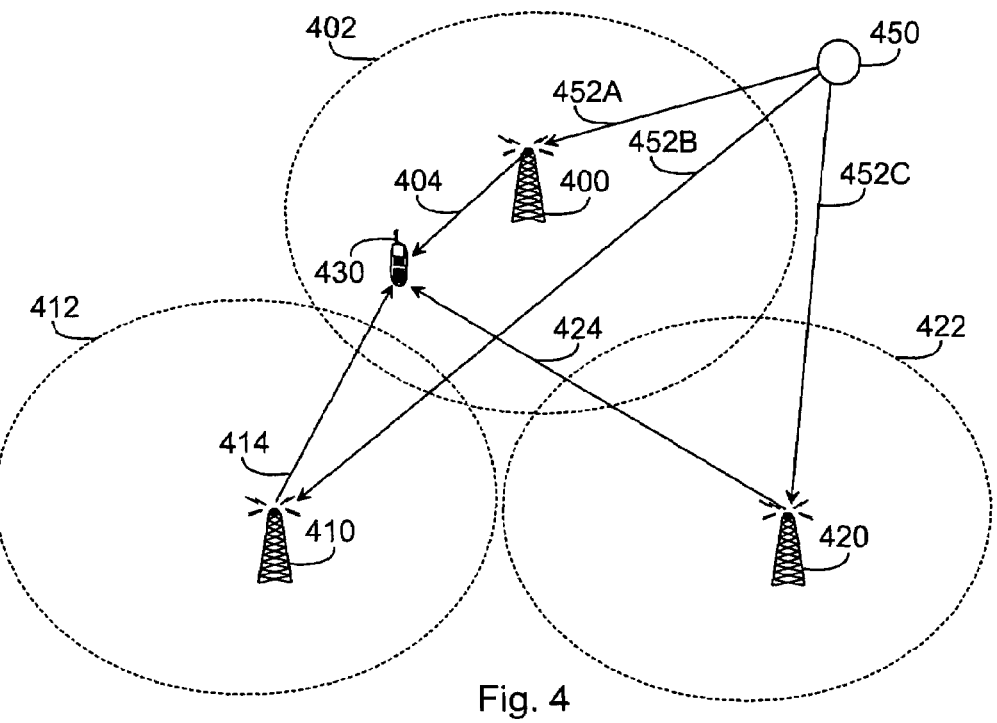
FIG. 4 shows an example of a structure of a telecommunication system.

FIG. 4 illustrates an example of a telecommunication system comprising base stations 400, 410, 420, a mobile station 430 and a time reference supply 450. The time reference supply 450 transmits time reference signals 452A, 452B, 45C, which are received by the time reference signal receiving units of the base stations 400, 410, and 420, respectively. The cells 402, 412, 422 of the base stations 400, 410 and 420, respectively, make up a cell structure, where the mobile station 430 is primarily located in the area of the serving cell 402.

In an embodiment, the telecommunication system comprises a positioning unit 148 operationally connected to the base station 110, 400 for positioning a mobile station 430 by using time characteristics of at least a portion of data to be transmitted from the base station 110. The positioning unit 148 can be connected to several base stations 400, 410, 420 in order to receive information, such as time characteristics of data, transmitted from the base stations 400, 410, 420. In an embodiment, the positioning unit 148 is implemented in the serving location mobile center (SMLC). In an embodiment, the positioning unit 148 is implemented in the radio network controller 140 by using a software application. The positioning unit 148 can also be located in the upper layers 150, 152 of the telecommunication system.

In an embodiment, the base station 110, 400 emits a symbol sequence 404 provided with time characteristics, which symbol sequence 404 is received by a mobile station 430. In an embodiment, the symbol sequence 404 is a pilot sequence, such as a primary common pilot channel. The mobile station 430 determines the time of arrival of the symbol sequence 404. In an embodiment, the mobile station 430 receives symbol sequences 414, 424 from plurality of base stations 400, 410, 420 and determines the observed time difference of arrival (OTDOA) of the symbol sequences 414, 424. In an embodiment, the mobile station 430 transmits the OTDOA results to the base station 110, 400 which delivers the OTDOA information to the positioning unit 148. The positioning unit 148 is aware of the real-time emission time of the symbol sequencies transmitted by the base stations 400, 410, 420 based on the determination of the time characteristics of the symbol sequencies 404, 414, 424 emitted by the base stations 400, 410, 420. The position of the mobile station 430 can be determined in a manner known to a person skilled in the art by using the OTDOA information and the real-time characteristics of the emitted symbol sequencies. In an embodiment, the measurement on a symbol sequence 414, 424 transmitted by a base station 410, 420 is performed while another base station 400 is transmitting an idle period 116, 200. In this manner, the transmit power of the base station 400 is temporarily lowered, thus reducing the multi-user interference caused by the base station 400, and improving the quality of the time of arrival measurement on the symbol sequences 414, 424 transmitted by the base stations 410, 420. Especially, when a distance of a base station 400 is substantially less than the distances of other base stations 410, 420, the idle period transmission of the close-lying base station 400 is useful.

In an embodiment, the mobile station 430 is configured to detect the idle period 116, 200 emitted from the antenna unit 122 of the base station 110, 400, the mobile station 430 is configured to determine the time of arrival of the idle period 116, 200, and the positioning unit 148 is configured to position the mobile station 430 by using the time of arrival of the idle period 116, 200. The detection of the idle period 116, 200 may be based on detection of change in the receive power. The time of arrival determination and positioning may be carried out in a manner known to a person skilled in the art.

Figure 5:
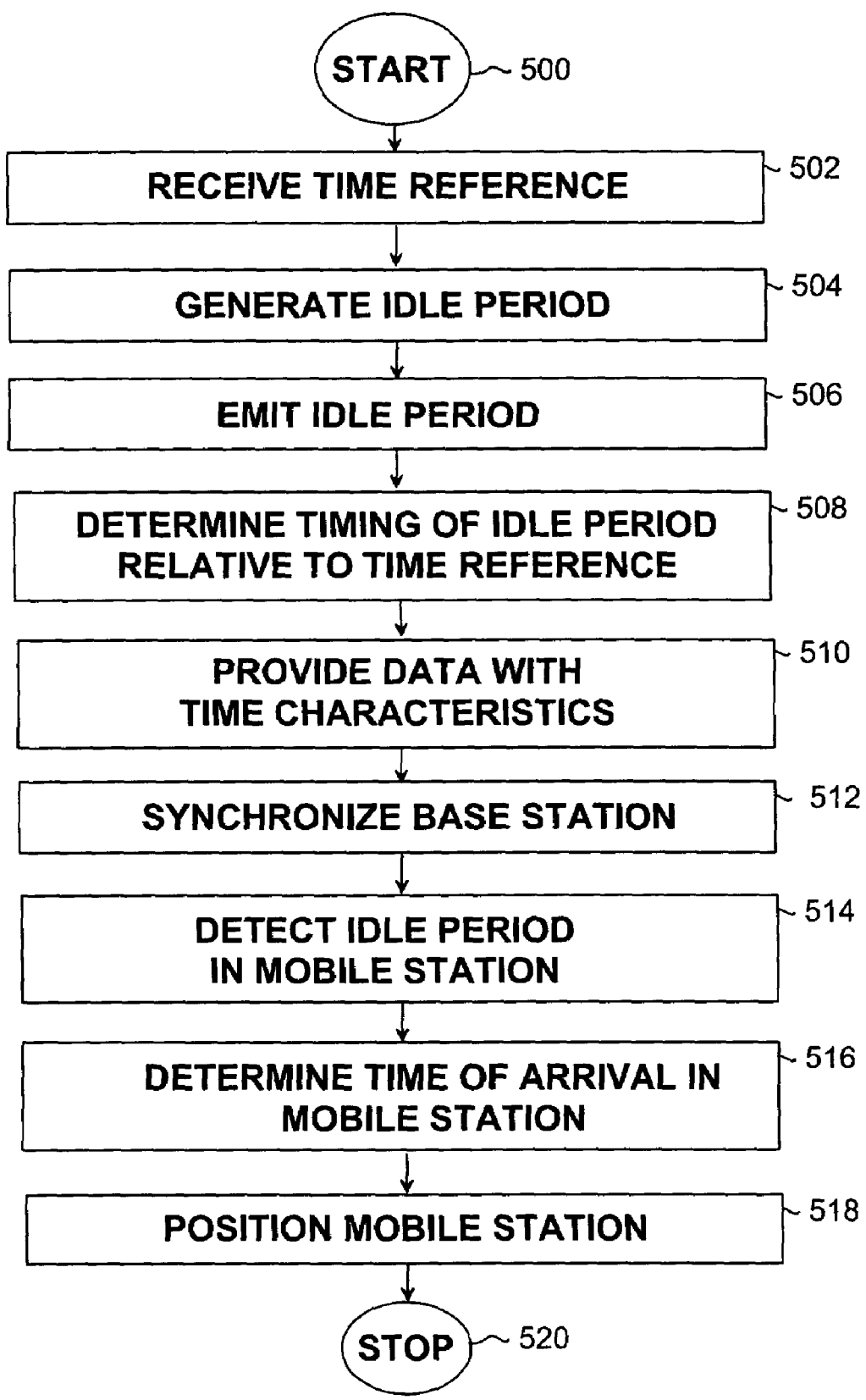
FIG. 5 is a flow diagram illustrating embodiments of the invention.

With reference to FIG. 5, embodiments of the time stamping method are illustrated by means of a flow chart. The method is started in 500. In 502, a time reference signal 128, 452A is received by a base station 110, 400. In 504, an idle period 116, 200 in the transmission of a base station 110, 400 is generated in the base station 110, 400. In 506, an idle period 116, 200 is emitted by the base station 110, 400. In 508, time characteristics 206, 208, 210 of the idle period 116, 200 relative to the time reference 134, 202 are determined. A portion of data to be transmitted from the base station 110, 400 is provided with the time characteristics proportional to time reference 202 by using the time characteristics 130, 206, 208, 210 of the idle period 200 in 510. In 518, a mobile station 430 is positioned by using the time characteristics of the at least portion of data. In 512, the transmission of the base station 110, 400 is synchronized by using time characteristics 130, 206, 208, 210 of the idle period 116, 200 relative to the time reference 202. In 514, the idle period 116, 200, 404 emitted from an antenna unit 122 of the base station 110, 400 is detected in a mobile station 430. In 516, the time or arrival of the idle period 116, 200 is determined in the mobile station 430. In 520, the method is stopped.

Figure 6:
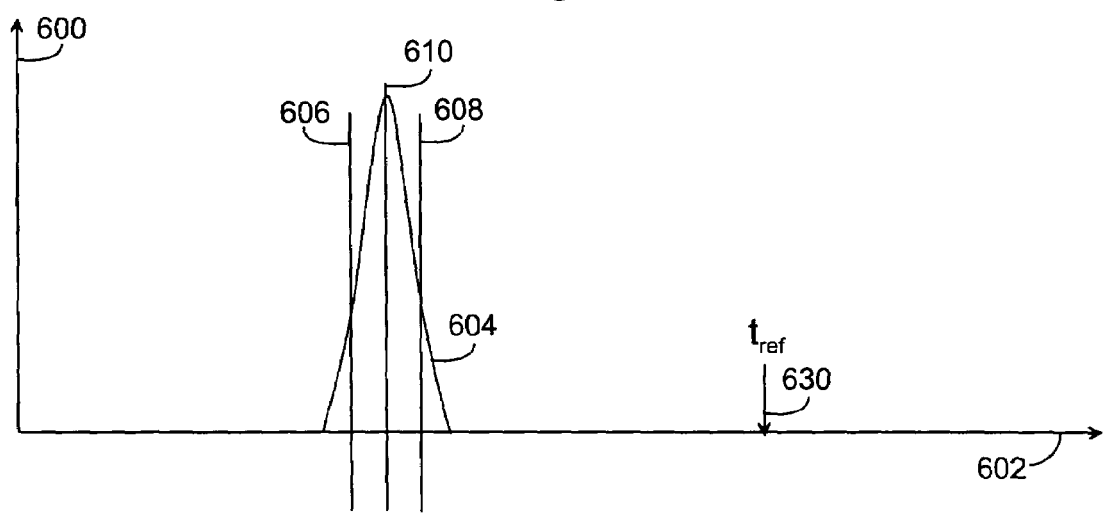
FIG. 6 shows an example of test signals according to embodiments of the invention.

In an aspect, the invention provides a time adjustment method in a telecommunication system. FIG. 6 shows a diagram including an example of a test signal 604 and a time reference 630. The vertical axis 600 and the horizontal axis 602 show signal power and time in arbitrary units, respectively. Embodiments of the time adjustment method are exemplified with reference to FIGS. 1 and 4.

In the time adjustment method, time reference signal 128, 452A providing time reference 134 in the telecommunication system is received in the time reference signal receiving unit 124 of a base station 110, 400. A test signal 116, 604 is generated in the base station 110, 400, which test signal 116, 604 is detected by a detecting unit 126 in the base station 110. In an embodiment, the test signal 116, 604 is generated in the base band unit 112 of the base station 110.

The test signal 116, 604 is provided with the time characteristics proportional to the time reference 134, 630 based on the detection of the test signal 116 and the time reference 134, 630. The time characteristics include timing of a predefined portion of the test signal 604. The predefined portion of the test signal 116, 604 include, for example; a portion 608 of a leading edge, a portion 606 of a trailing edge, and the peak 610 of the test signal 604. The timing of the predefined portion of the test signal 116, 604 is, for example, the time of emission of the predefined portion 606, 608, 610 of the test signal 116, 604.

In an embodiment, the internal clock of the base station 110, 400 is real-time adjusted by using the test signal 116, 604 and the time reference 134, 630. In real-time adjustment, the time provided by the internal clock of the base station 110, 400 corresponds to the time of emission of a signal from the antenna unit 122.

In an embodiment, data transmitted from the base station 110, 400 is provided with time characteristics proportional to the time reference 630 by using time characteristics 606, 608, 610 of the test signal 604. For example, a predefined portion of frame 300 shown in FIG. 3 is provided with the time of emission from the antenna unit 122.

In an embodiment, the test signal 604 is emitted from an antenna unit 122 of the base station 110, and the test signal 116, 604 is detected when emitting the test signal 604. In this manner, the delay occurring between the base band unit 112 and the antenna unit 122 can be compensated.

In an embodiment, a delay between generating the test signal 116, 604 and detecting the test signal 116, 604 is determined. In an embodiment, the delay is determined by a measuring the time difference between generating and detecting the test signal 116, 604 using the internal clock of the base station 110, 400.

In an embodiment, the base station 110, 400 is synchronized by using time characteristics 606, 608, 610 of the test signal 116, 604. A plurality of base stations 400, 410, 420 using the same time reference supply 450 can be synchronized accurately using the method according to the invention.

Figure 7:
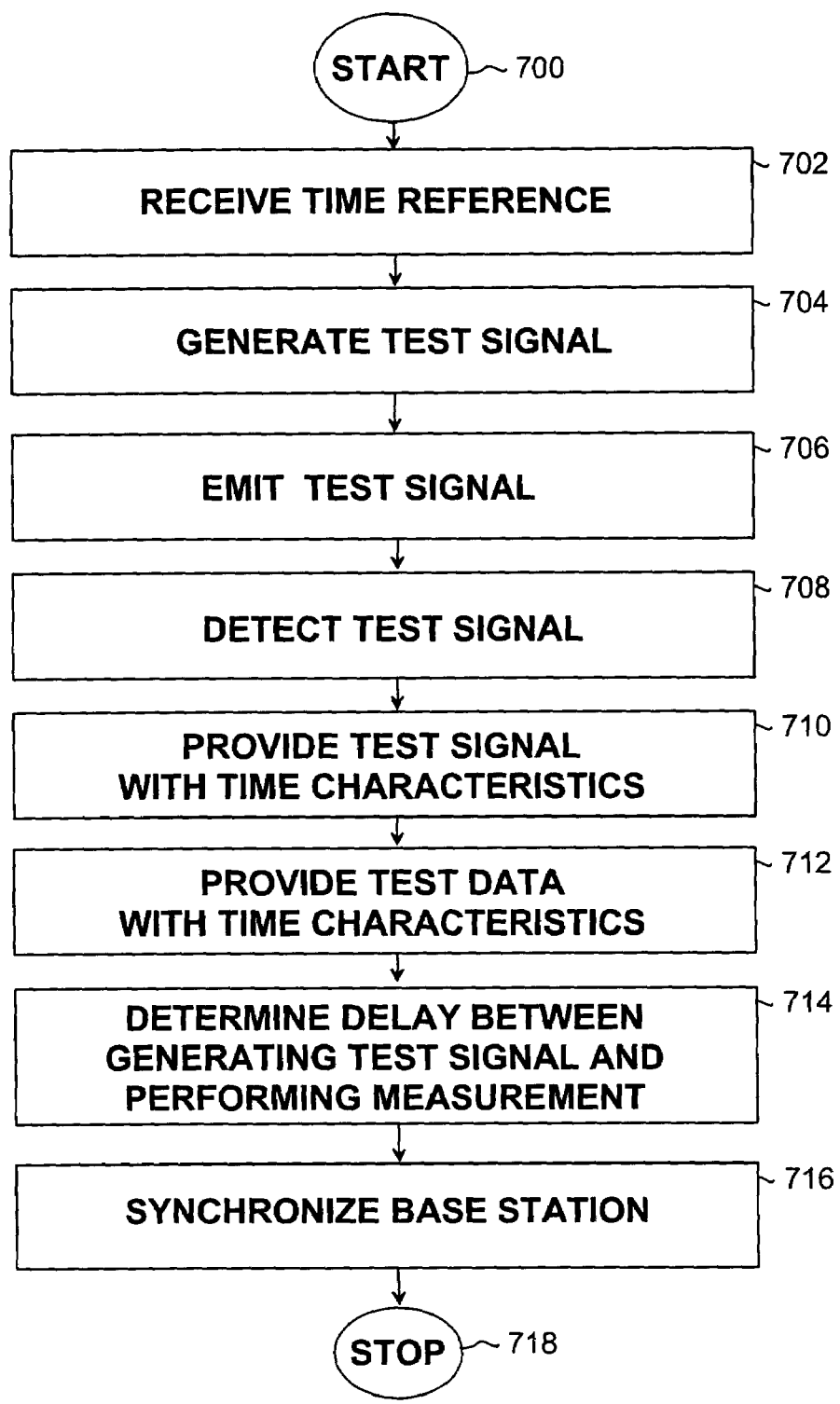
FIG. 7 is a second flow diagram illustrating embodiments of the invention.

Embodiments of the time adjustment method are shown by means of a flow chart in FIG. 7. In 700, the method is started. In 702, the time reference signal 128 is received. In 704, the test signal 604 is generated. In 706, the test signal 116, 604 is emitted from an antenna unit 122 of the base station 110. In 708, the test signal 116, 604 is detected in the base station 110. In 710, the test signal 116, 604 is provided with time characteristics proportional to the time reference 630. In 712, data transmitted from the base station 110 is provided with time characteristics proportional to the time reference 730 by using time characteristics of the test signal 116, 604. In 714, a delay between generating 704 the test signal 116, 604 and detecting 708 the test signal 116, 604 is determined. In 716, the base station 110 is synchronized by using the time characteristics of the test signal 116, 604. In 718, the method is stopped.

Even though the invention is described above with reference to examples according to the accompanying drawings, it is clear that the invention is not restricted thereto but it can be modified in several ways within the scope of the appended claims.

We claim:

1. A method, comprising:
    receiving, in a base station, a time reference signal providing time reference in a telecommunication system;
    generating an idle period in the transmission of a base station;
    determining, in the base station, time characteristics of the idle period relative to the time reference by performing a power measurement on the idle period; and timestamping at least a portion of data to be transmitted from the base station with time characteristics proportional to the time reference by using time characteristics of the idle period.

2. The method of claim 1 further comprising positioning a mobile station by using time characteristics of the at least portion of data.

3. The method of claim 1 further comprising
emitting the idle period from an antenna of the base station; and
determining time characteristics of the idle period such that an uncertainty of a time interval between determining time characteristics of the idle period and emitting the idle period from the antenna of the base station is below a predefined value.

4. The method of claim 1 further comprising
emitting the idle period from an antenna of the base station; and
determining time characteristics of the idle period at a moment of emitting the idle period from the antenna of the base station.

5. The method of claim 1, further comprising
determining timing of a predefined portion of the idle period relative to the time reference by using the power measurement; and
timestamping the at least a portion of data to be transmitted from the base station with time characteristics proportional to the time reference by using the timing of the predefined portion of the idle period.

6. The method of claim 1 further comprising
determining time characteristics of an idle period in a frame relative to the time reference;
providing the frame with the time characteristics proportional to the time reference by using time characteristics of the idle period in the frame.

7. The method of claim 1 further comprising
emitting the idle period from an antenna of the base station;
detecting, in a mobile station, the idle period emitted from the antenna of the base station;
determining the time of arrival of the idle period in the mobile station; and
positioning the mobile station by using the time of arrival of the idle period.

8. The method of claim 1 further comprising synchronizing the transmission of the base station by using the time characteristics of the idle period relative to the time reference.

9. A system, comprising:
a base station configured to provide radio transmission and reception for mobile stations;
wherein the base station comprises a time reference signal receiver configured to receive a time reference signal providing time reference in a telecommunication system;
wherein the base station comprises an idle period generator configured to generate an idle period in the transmission of the base station;
wherein the base station comprises a detector operationally connected to the idle period generator and the time reference signal receiver, said detector configured to determine time characteristics of the idle period relative to the time reference by performing a power measurement on the idle period; and
a time stamper operationally connected to the detector configured to provide at least a portion of data to be transmitted from the base station with the time characteristics proportional to the time reference by using the time characteristics of the idle period.

10. The system of claim 9 further comprising a positioner operationally connected to the base station configured to position a mobile station by using time characteristics of the at least a portion of data.

11. The system of claim 9, wherein the base station comprises an antenna operationally connected to the idle period generator configured to emit the idle period; and
wherein the detector is configured to determine time characteristics of the idle period such that the uncertainty of the time interval between determining time characteristics of the idle period and emitting the idle period from the antenna of the base station is below a predetermined value.

12. The system of claim 9, wherein the base station comprises an antenna operationally connected to the idle period generator configure to emit the idle period; and
the detector is configured to determine time characteristics of the idle period at a moment of emitting the idle period.

13. The system of claim 9, wherein the detector is configured to determine timing of a predefined portion of the idle period relative to the time reference by the power measurement; and
wherein the time stamper is configured to provide the at least a portion of data to be transmitted from the base station with time characteristics proportional to the time reference by using the timing of the predefined portion of the idle period.

14. The system of claim 9, wherein the detector is configured to determine the time characteristics of an idle period in a frame relative to time reference; and
wherein the time stamper is configured to provide the frame with the time characteristics proportional to the time reference by using time characteristics the idle period in the frame.

15. The system of claim 9, wherein the base station comprises an antenna operationally connected to the idle period generator configured to emit the idle period;
the telecommunication system further comprising a mobile station configured to detect the idle period emitted from the antenna of the base station;
wherein the mobile station is configured to determine the time of arrival of the idle period; and
wherein the positioner is configured to position the mobile station by using the time of arrival of the idle period.

16. The system of claim 9, wherein the base station is configured to synchronize transmission of the base station by using time characteristics of the idle period relative to the time reference.

17. An apparatus, comprising:
receiving means for receiving, in a base station, a time reference signal providing time reference in the telecommunication system;
generating means for generating an idle period in the transmission of a base station;
determining means for determining, in the base station, time characteristics of the idle period relative to the time reference by performing a power measurement on the idle period; and
time stamping means for providing at least a portion of data to be transmitted from the base station with time characteristics proportional to the time reference by using time characteristics of the idle period.

18. The apparatus of claim 17 further comprising positioning means for positioning a mobile station by using time characteristics of the at least portion of data.

19. The apparatus of claim 17 further comprising emitting means for emitting the idle period from an antenna of the base station; and
- second determining means for determining time characteristics of the idle period such that an uncertainty of a time interval between determining time characteristics of the idle period and emitting the idle period from the antenna of the base station is below a predefined value.

20. The apparatus of claim 17 further comprising emitting means for emitting the idle period from an antenna of the base station; and
- second determining means for determining time characteristics of the idle period at a moment of emitting the idle period from the antenna of the base station.

21. The apparatus of claim 17 further comprising second determining means for determining timing of a predefined portion of the idle period relative to the time reference by means of the power measurement; and
- providing means for providing the at least a portion of data to be transmitted from the base station with time characteristics proportional to the time reference by using the timing of the predefined portion of the idle period.

22. The apparatus of claim 17 further comprising second determining means for determining time characteristics of an idle period in a frame relative to the time reference;
- second providing means for providing the frame with the time characteristics proportional to the time reference by using time characteristics of the idle period in the frame.

23. The apparatus of claim 17 further comprising emitting means for emitting the idle period from an antenna of the base station;
- detecting means for detecting, in a mobile station, the idle period emitted from the antenna of the base station;
- second determining means for determining the time of arrival of the idle period in the mobile station; and
- positioning means for positioning the mobile station by using the time of arrival of the idle period.

24. The apparatus of claim 17 further comprising synchronizing means for synchronizing the transmission of the base station by using the time characteristics of the idle period relative to the time reference.

25. An apparatus, comprising:
- a time referencing signal receiver configured to receive a time reference signal providing time reference in a telecommunication system;
- an idle period generator configured to generate an idle period in the transmission of a base station;
- a detector operationally connected to the idle period generator and the time reference signal receiver, the detector configured to determine time characteristic of the idle period relative to the time reference by performing a power measurement on the idle period; and
- a time stamper operationally connected to the detector and configured to provide at least a portion of data to be transmitted from the base station with the time characteristics proportional to the time reference by using the time characteristic of the idle period.

26. The method of claim 1, further comprising performing the power measurement of the idle period with a gauge located between the base band portion and the antenna of a base station.

27. The system of claim 9, further comprising a gauge located between the base band portion and the antenna of a base station, wherein the gauge is configured to perform the power measurement on the idle period.

28. The apparatus of claim 17, further comprising power measuring means located between the base band portion and the antenna of a base station, wherein the power measuring means is for measuring the power measurement on the idle period.

29. The apparatus of claim 25, further comprising a gauge located between the base band portion and the antenna of a base station, wherein the gauge is configured to perform the power measurement on the idle period.

30. The apparatus of claim 25, further comprising:
- an antenna operationally connected to the idle period generator configured to emit the idle period;
- wherein the detector is configured to determine time characteristics of the idle period such that the uncertainty of the time interval between determining time characteristics of the idle period and emitting the idle period from the antenna of the base station is below a predetermined value.

31. The apparatus of claim 25, further comprising:
- an antenna operationally connected to the idle period generator configure to emit the idle period;
- wherein the detector is configured to determine time characteristics of the idle period at a moment of emitting the idle period.

32. The apparatus of claim 25, wherein the detector is configured to determine timing of a predefined portion of the idle period relative to the time reference by the power measurement; and
- wherein the time stamper is configured to provide the at least a portion of data to be transmitted from the base station with time characteristics proportional to the time reference by using the timing of the predefined portion of the idle period.

33. The apparatus of claim 25, wherein the detector is configured to determine the time characteristics of an idle period in a frame relative to time reference; and
- wherein the time stamper is configured to provide the frame with the time characteristics proportional to the time reference by using time characteristics the idle period in the frame.

34. The apparatus of claim 25, wherein the apparatus is configured to synchronize transmission of a base station by using time characteristics of the idle period relative to the time reference.

* * * * *